(12) United States Patent
Patel

(10) Patent No.: US 7,181,196 B2
(45) Date of Patent: Feb. 20, 2007

(54) PERFORMING AUTHENTICATION IN A COMMUNICATIONS SYSTEM

(75) Inventor: Sarvar M. Patel, Montville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 419 days.

(21) Appl. No.: 10/438,686

(22) Filed: May 15, 2003

(65) Prior Publication Data

US 2004/0229597 A1 Nov. 18, 2004

(51) Int. Cl.
- H04M 1/66 (2006.01)
- H04M 1/68 (2006.01)
- H04M 3/16 (2006.01)
- H04K 1/00 (2006.01)

(52) U.S. Cl. .............. 455/411; 455/410; 455/517; 380/247; 380/249; 380/281; 380/284

(58) Field of Classification Search .......... 455/411, 455/410, 517, 424, 425; 380/247, 287; 705/67, 705/44

See application file for complete search history.

(56) References Cited

U.S. PATENT DOCUMENTS

| | | | | |
|---|---|---|---|---|
| 5,537,474 | A * | 7/1996 | Brown et al. .............. | 380/248 |
| 6,195,547 | B1 * | 2/2001 | Corriveau et al. .......... | 455/419 |
| 6,763,094 | B2 * | 7/2004 | Conn et al. ............... | 379/91.01 |
| 2001/0048744 | A1 * | 12/2001 | Kimura ..................... | 380/247 |
| 2002/0012433 | A1 * | 1/2002 | Haverinen et al. .......... | 380/247 |
| 2002/0161723 | A1 * | 10/2002 | Asokan et al. .............. | 705/67 |
| 2003/0028763 | A1 * | 2/2003 | Malinen et al. ............. | 713/155 |
| 2003/0045271 | A1 * | 3/2003 | Carey et al. ............... | 455/411 |
| 2003/0096595 | A1 * | 5/2003 | Green et al. ............... | 455/411 |
| 2004/0162105 | A1 * | 8/2004 | Reddy et al. ............... | 455/551 |
| 2004/0166874 | A1 * | 8/2004 | Asokan et al. ............. | 455/456.1 |
| 2004/0242238 | A1 * | 12/2004 | Wang et al. ............... | 455/456.1 |
| 2005/0078824 | A1 * | 4/2005 | Malinen et al. ............ | 380/247 |
| 2005/0090232 | A1 * | 4/2005 | Hsu .......................... | 455/411 |

(Continued)

FOREIGN PATENT DOCUMENTS

EP 1 478 204 A2 11/2004

(Continued)

OTHER PUBLICATIONS

H. Haverinen: "EAP SIM Authentication" IETF, [online] Feb. 2003, pp. 1-52, XP002293906; [retrieved on Aug. 24, 2001 from URL:http://www.watersprings.org/pub/id/draft-haverinen-pppext-eap-sim-10.txt].

(Continued)

Primary Examiner—Jean Gelin
Assistant Examiner—Huy Phan

(57) ABSTRACT

A method and apparatus for performing authentication in a communications system is provided. The method includes receiving a request for authentication from a server, the request for authentication including a first and a second random challenge, and comparing the first random challenge and the second random challenge. The method further includes denying the request for authentication in response to determining that the first random challenge is substantially the same as the second random challenge, and transmitting an encoded value to the server in response to determining that the first random challenge is different from the second random challenge, wherein the encoded value is generated based on the first and second random challenge and a key that is not shared with the server.

26 Claims, 4 Drawing Sheets

U.S. PATENT DOCUMENTS

2005/0105731 A1* 5/2005 Basquin ................... 380/247
2005/0125662 A1* 6/2005 Fischer et al. ............. 713/168
2006/0004643 A1* 1/2006 Stadelmann et al. ......... 705/34

FOREIGN PATENT DOCUMENTS

| WO | WO 00/02406 | 1/2000 |
| WO | WO 02/052784 A1 | 7/2002 |
| WO | WO 2004/032557 A1 | 4/2004 |

OTHER PUBLICATIONS

European Search Report dated Feb. 9, 2005.

* cited by examiner

PERFORMING AUTHENTICATION IN A COMMUNICATIONS SYSTEM

BACKGROUND OF THE INVENTION

1. Field of the Invention

This invention relates generally to a communications system, and, more particularly, to performing authentication in a wireless communications system.

2. Description if the Related Art

Masquerading and eavesdropping are potential threats to the security of wireless communications. To provide proper protection for communication over a wireless link, it is desirable to first authenticate the communicating devices and then to encrypt contents of the communications. Several well known protocols have been proposed by standards bodies in recent years to authenticate the identity of the remote party. One such protocol currently under consideration is the Extensible Authentication Protocol for authentication and session key distribution using the Global System for Mobile (GSM) Subscriber Identity Module (SIM). This protocol is hereinafter referred to as the EAP-SIM protocol.

The EAP-SIM protocol is based on proposed enhancements to existing Global System for Mobile communications authentication procedures. The EAP-SIM protocol specifies a mechanism for mutual authentication and session key agreement using the GSM System Identity Module. For mutual authentication, the client and the server must prove their respective identities to each other before performing any application functions. The central principal of mutual authentication is that neither party must "trust" the other before identity has been proven.

The GSM network authenticates the identity of the subscriber based on a challenge-response mechanism. The GSM network sends a 128-bit random number (RAND) challenge to a mobile station. The mobile station computes a 32-bit signed response (SRES) and a 64-bit cipher key, $K_c$, based on the random number (RAND) using an individual subscriber authentication key ($K_i$). The mobile station then transmits the SRES to the GSM network. Upon receiving the SRES from the mobile station, the GSM network repeats the calculation to verify the identity of the mobile station. Note that the individual subscriber authentication key ($K_i$) is never transmitted over the radio channel. It is present in the mobile station, as well as in the database of the service network. If the received SRES agrees with the calculated value, the mobile station has been successfully authenticated, and thus, the communication may continue. If the values do not match, the connection is terminated and an authentication failure is indicated to the mobile station.

The GSM network, as described above, thus utilizes a single RAND challenge to authenticate the identity of the mobile station. The EAP-SIM protocol, based on the authentication procedures of GSM, specifies a mechanism for mutual authentication using a 64-bit cipher key, $K_c$. Performing mutual authentication based on a 64-bit key, however, may not provide the desired security level as would otherwise be provided by, for example, a 96-bit or a 128-bit key. In an effort to offer a more secure authentication mechanism, the EAP-SIM protocol states that up to three (3) RAND challenges, and thus up to three 64-bit keys $K_c$, may be utilized during the authentication procedure. The three 64-bit keys, when combined, result in a 192-bit key, which should presumably provide increased security. However, simply combining a plurality of cipher keys does not necessarily result in increased security because an impersonator (or unscrupulous party) may still be able to successfully perform authentication with a mobile station based on correctly guessing the value of a 64-bit key. This is because the EAP-SIM protocol does not require that each RAND challenge (and thus each $K_c$ key) be unique for a given set of triplets. An impersonator can thus establish an unauthorized session, and thereby carry on a full conversation, with a mobile station by first correctly guessing a value of a single 64-bit cipher key and then using multiple copies of that key to authenticate itself to the mobile station.

The present invention is directed to overcoming, or at least reducing, the effects of, one or more of the problems set forth above.

SUMMARY OF THE INVENTION

In one embodiment of the present invention, a method for performing authentication in a communications system is provided. The method includes receiving a request for authentication from a server, the request for authentication including a first and a second random challenge, and comparing the first random challenge and the second random challenge. The method further includes denying the request for authentication in response to determining that the first random challenge is substantially the same as the second random challenge, and transmitting an encoded value to the server in response to determining that the first random challenge is different from the second random challenge, wherein the encoded value is generated based on the first and second random challenge and a key that is not shared with the server.

In one embodiment of the present invention, an apparatus for performing authentication in a communications system is provided. The apparatus includes a receiver adapted to receive a request for authentication from the server, the request for authentication including a first and a second random challenge. The apparatus includes a control unit communicatively coupled to the receiver. The control unit is adapted to compare the first random challenge and the second random challenge, and deny the request for authentication in response to determining that the first random challenge is substantially the same as the second random challenge. The control unit is further adapted to transmit an encoded value to the server in response to determining that the first random challenge is different from the second random challenge, wherein the encoded value is generated based on the first and second random challenge and a key that is not shared with the server.

In one embodiment of the present invention, a system is provided for performing authentication. The system includes a server having access to a plurality of challenges and to a plurality of associated values generated based on a key that is not accessible to the server, the server being adapted to transmit a request for authentication including at least a first and a second challenge from the plurality of challenges. The system includes an apparatus to compare the first random challenge and the second random challenge, and deny the request for authentication in response to determining that the first random challenge is substantially the same as the second random challenge. The apparatus is adapted to transmit an encoded value to the server in response to determining that the first random challenge is different from the second random challenge, wherein the encoded value is based on at least a portion of the values associated with the first and second random challenges and the secret key.

In one embodiment of the present invention, a method for performing authentication in a communications system is provided. The method comprises determining one or more challenges to transmit to an access terminal, determining a message authentication code value for the one or more challenges. The message authentication code value for the at least one or more challenges comprises determining a cipher key associated with each of the one or more challenges, determining a signed response associated with each of the one or more challenges and determining a master key based on one or more of the cipher keys and the signed responses to determine the message authentication code. The message authentication code value for the at least one or more challenges further comprises transmitting the one or more challenges and the message authentication code to the access terminal.

BRIEF DESCRIPTION OF THE DRAWINGS

The invention may be understood by reference to the following description taken in conjunction with the accompanying drawings, in which like reference numerals identify like elements, and in which.

Figure 1:
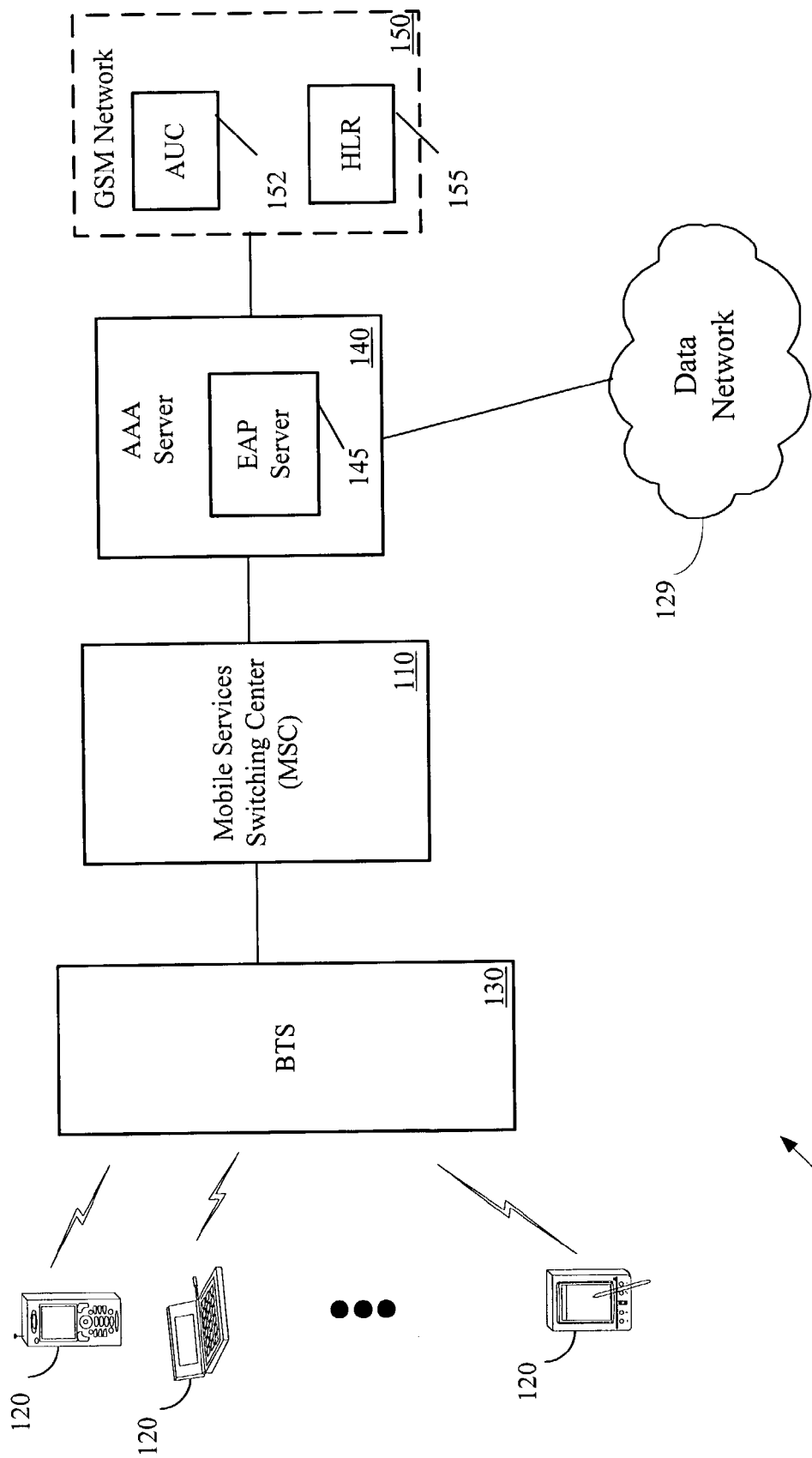
FIG. 1 is a block diagram illustration of a communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a communications system 100 is illustrated, in accordance with one embodiment of the present invention. For illustrative purposes, authentication in the communications system 100 of FIG. 1 is performed according to the EAP-SIM protocol, although it should be understood that other authentication protocols may be employed in alternative embodiments without departing from the spirit and scope of the invention. An Internet draft of the EAP-SIM Protocol (February 2003) has been made available by the Internet Engineering Task Force, and is available at http://www.watersprings.org/pub/id/draft-haverinen-pppext-eap-sim-10.txt.

The communications system 100 of FIG. 1 includes a mobile services switching center 110 that allows one or more access terminals 120 to communicate with a data network 129, such as the Internet, through one or more base stations (BTS) 130. The mobile services switching center 110 of FIG. 1 generally provides replication, communications, runtime, and system management services. The mobile services switching center 110 may also handle call processing functions, such as setting and terminating a call path. The access terminal 120 may include one of a variety of devices, including cellular phones, personal digital assistants (PDAs), laptops, digital pagers, wireless cards, and any other device capable of accessing the data network 129.

Figure 2:
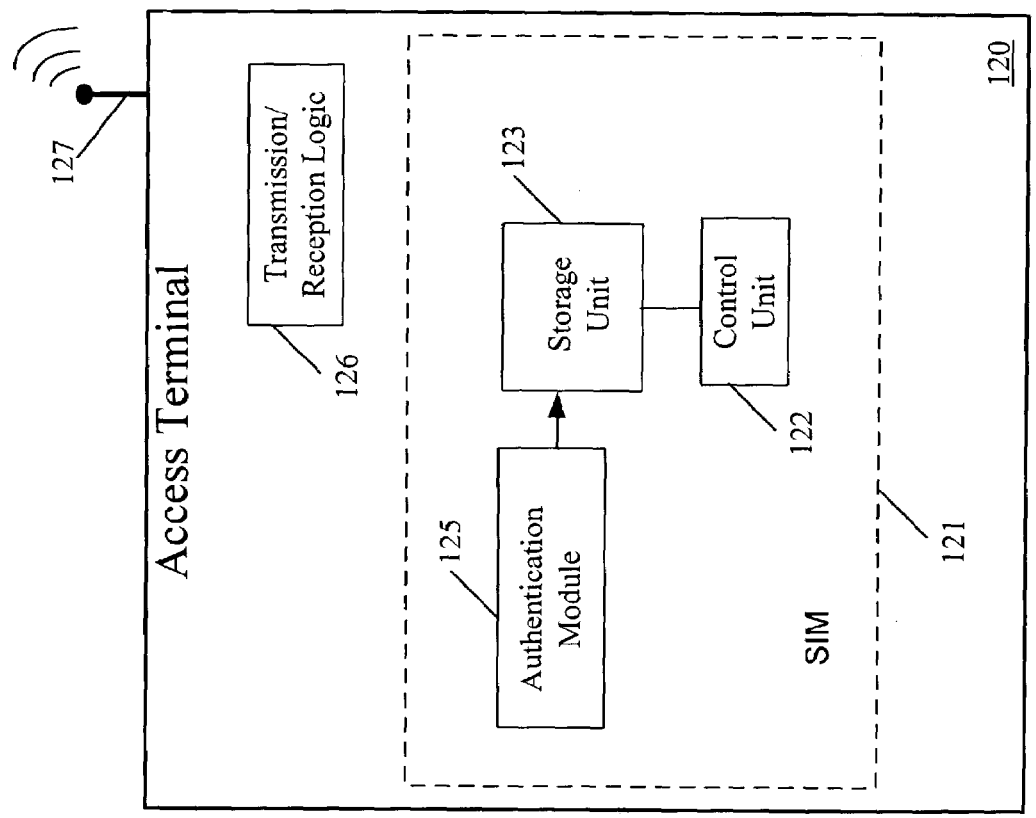
FIG. 2 depicts a block diagram of an access terminal, in accordance with one embodiment of the present invention.

An exemplary block diagram of the access terminal 120 is shown in FIG. 2, in accordance with one embodiment of the present invention. Although not so limited, in the illustrated embodiment, the access terminal 120 is a GSM cellular telephone handset. The access terminal 120 includes a subscriber identity module (SIM) 121, which includes a control unit 122 and a storage unit 123. In the depicted embodiment, the SIM 121 includes an authentication module 125 for performing authentication procedures in a manner described in greater detail below. The authentication module 125, if implemented in software, may be executable by the control unit 122 and storable in the storage unit 123. Although not shown in FIG. 2, the SIM 121 may include an international mobile subscriber identity (IMSI), an individual subscriber authentication key ($K_i$), a ciphering key generating algorithm (A8), and a personal identification number (PIN). The access terminal 120 in the illustrated embodiment includes transmission/reception logic 126 and an antenna 127 for transmitting and receiving data over a wireless link.

Referring again to FIG. 1, the communications system 100 includes a mobile services switching center 110 that is coupled to an authentication, authorization, and Accounting (AAA) server 140. In the illustrated embodiment, the AAA server 140 includes an EAP server 145, although in alternative embodiments the EAP server 145 may be implemented in a standalone device. The EAP server 145 interfaces with a GSM network 150 and operates as a gateway between the data network 129 and a GSM network 150. The GSM network 150 includes a home location register (HLR) 155 that provides the mobile services switching center 110 with one or more triplets, where each triplet comprises a random (RAND) challenge (e.g., a random number), a signed response (SRES), and a cipher key ($K_c$). In one embodiment, the RAND is an 128 bit number, and it is used with the individual subscriber authentication key $K_i$ (which may be up to 128 bits long) to generate the cipher key $K_c$ and the SRES value, which are 64 bits and 32 bits long, respectively.

As described in greater detail below, in accordance with one or more embodiments of the present invention, an improved scheme is provided for performing mutual authentication between the access terminal 120 and the EAP server 145. In accordance with one embodiment of the present invention, the mutual authentication procedure implemented in the communications system 100 offers greater security than that available under some of the existing protocols.

The data network 129 shown in FIG. 1 may be a packet-switched data network, such as a data network according to the Internet Protocol (IP). One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 129 may also include other types of packet-based data networks in further embodiments. Examples of such other packet-based data networks include Asynchronous Transfer Mode (ATM), Frame Relay networks, and the like.

As utilized herein, a "data network" may refer to one or more communication networks, channels, links, or paths, and systems or devices (such as routers) used to route data over such networks, channels, links, or paths.

It should be understood that the configuration of the communications system 100 of FIG. 1 is exemplary in nature, and that fewer or additional components may be employed in other embodiments of the communications system 100. For example, the GSM network 150 may also include a visitor location register (not shown) for storing sets of triplets that are generated by the authentication center (AuC) 152. As another example, in one embodiment, the system 100 may include a network management system (not shown) that provides operation, administration, maintenance, and provisioning functions. Additionally, although the mobile services switching center 110 and the AAA server 140 are shown as separate elements, in an alternative embodiment, the functionality of these elements may be performed by a single element.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Figure 3:
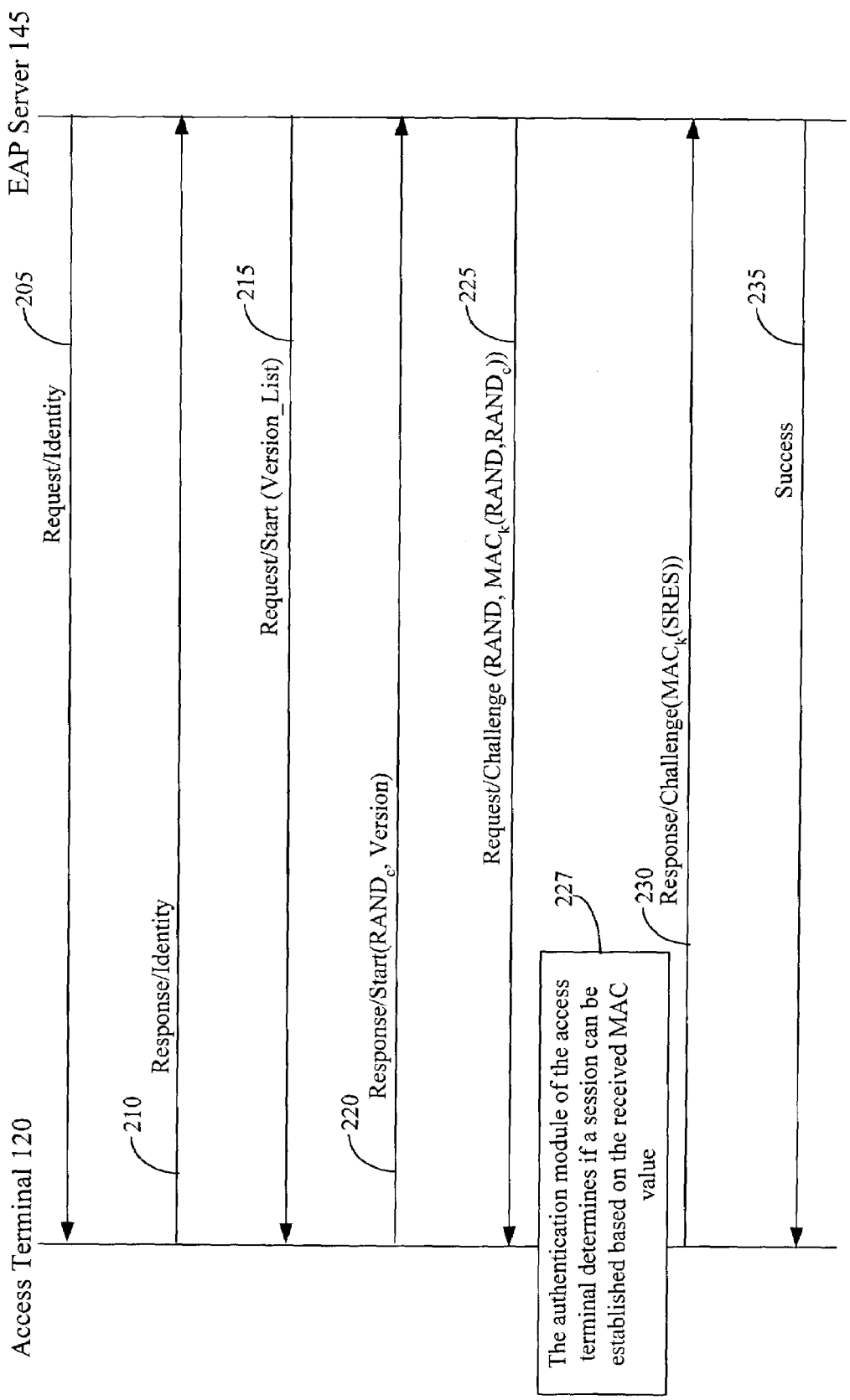
FIG. 3 depicts an exemplary message flow diagram of an authentication procedure that is implemented in the communications system of FIG. 1, in accordance with one embodiment of the present invention.

Referring now to FIG. 3, one embodiment of an authentication procedure that may be employed in the communications system 100 of FIG. 1 is illustrated. The authentication procedure commences with the EAP server 145 providing an identity request (at 205) to the access terminal 120. The access terminal 120 responds (at 210) with an identifier that uniquely identifies the access terminal 120. For example, the access terminal 120 may provide an identifier that includes the International Mobile Subscriber Identity (IMSI) or a temporary identity (pseudonym).

Following the response provided (at 210) by the access terminal 120, the access terminal receives a start request (at 215) from the EAP server 145. The access terminal 120 responds (at 220) to the received start request. Through the start request and the start response, the access terminal 120 and the EAP server 145 negotiate a version of a protocol that is supported by both sides. In particular, the start request provided (at 215) by the EAP server 145 contains a Version_List attribute that indicates the version list that is supported by the EAP server 145, and the start response provided (at 220) by the access terminal 120 includes a version attribute that contains the version number that is selected by the access terminal 120. In its start response (at 220), the access terminal 120 also transmits an initial challenge, $RAND_c$, to the EAP server 145.

Upon receiving the start response (at 220) from the access terminal 120, the EAP server 145 obtains one or more GSM triplets from the Authentication Centre (AuC) 152 of the GSM network 150. In some cases, the GSM triplets may be prefetched by the EAP server 145 in anticipation of possible future use. The EAP-SIM protocol supports using up to three triplets for performing authentication. As noted earlier, each triplet comprises a random (RAND) challenge, a signed response (SRES), and a cipher key ($K_c$), where the SRES and $K_c$ are calculated based on the RAND value and the $K_i$ key. The EAP server 145 does not specify that the RAND challenges of different triplets must be different.

Next, the EAP server 145 provides (at 225) a challenge request to the access terminal 120. The challenge request contains one or more RAND challenges and a message authentication code, $MAC_k$, associated with the one or more of the RAND challenges. Algorithms for calculating MAC values are well known to those skilled in art. One exemplary algorithm for calculating MAC values is described in a reference entitled, "HMAC: Keyed-Hashing for Message Authentication", by H. Krawczyk, M. Bellare, R. Canetti, RFC 2104, February 1997.

In the authentication procedure illustrated in FIG. 3, the $MAC_k$ is calculated based at least on the RAND values from the received triplets and the $RAND_c$ (which was transmitted previously (at 220) by the access terminal 120). For example, assuming that the EAP server 145 transmits two RAND challenges (R1 and R2), the $MAC_k$ is calculated based at least on the R1, R2, and $RAND_c$. The EAP-SIM protocol specifies that an authorization key, k, is needed before a MAC value may be calculated. To calculate the authorization key, k, a master key (MK) first needs to be calculated. The MK can be calculated using equation (1) below:

$$MK=SHA[\ldots, \text{cipher keys } (K_{c1}, K_{c2}, K_{c3}), RAND_c, \ldots], \quad (1)$$

where SHA represents a secure hash algorithm, and the cipher keys are part of the GSM triplets, and $RAND_c$ is the initial challenge provided by the access terminal 120. One example of a secure hash algorithm is described in Federal Information Processing Standard (FIPS) Publication 180-1, entitled "Secure Hash Standard," published by National Institute of Standards and Technology, dated Apr. 17, 1995.

It should be appreciated that the MAC value and master key may be calculated based on other types of information (e.g., version number, identity, etc.) as well; however, for illustrative purposes and to avoid unnecessarily obscuring the described embodiments of the present invention, these details are not described herein.

The master key (MK), once calculated using equation (1) above, is provided to a pseudo-random number function (PRF) to generate the authorization key, k, that, as noted, is needed to calculate the MAC value. An exemplary pseudo-random number function that may be employed is described in a reference entitled, "HMAC: Keyed-Hashing for Message Authentication", by H. Krawczyk, M. Bellare, R. Canetti, RFC 2104, February 1997.

Once the authentication key, k, is calculated, the EAP server 145 determines the MAC value based at least on the RAND challenges (i.e., $RAND_c$ and RAND numbers from the received GSM triplets) that are to be transmitted to the access terminal 120. The calculated MAC value, along with the RAND challenges of one or more of the GSM triplets, is then transmitted (at 225) to the access terminal 120.

The authentication module 125 (see FIG. 2) of the access terminal 120 determines (at 227) if a session can be established with the mobile services switching center 110 (see FIG. 1) to access the data network 129 based on the received RAND challenges and the MAC value. The session can be established if the access terminal 120 can authenticate the EAP server 145. As is described below, in accordance with the one embodiment of the present invention, the access terminal 120 establishes a session upon determining that the received MAC value is valid and upon determining that no two of the received RAND challenges are identical (or substantially identical).

The access terminal 120 verifies the validity of the received MAC value by independently calculating its MAC value of the RAND challenges transmitted by the EAP server 145 and then comparing the calculated MAC value to the received MAC value. Because the initial key, $K_i$, is available to the access terminal 120, the access terminal 120 can calculate the MAC value in the same manner as it is calculated by the EAP server 145. Under the EAP-SIM protocol, the access terminal 120 can authenticate the EAP server 145 based on determining that the received MAC value is valid. However, authenticating based on the validity of the received MAC value may offer limited security because an unscrupulous party may be able to establish a session with the access terminal 120 by correctly guessing the value of a 64-bit $K_c$ key. That is, by guessing the correct value of $K_c$, an impersonator can calculate the master key (MK) to derive the authentication key, k, which can then be used to determine the MAC value. The impersonator can transmit the MAC value to the access terminal 120 to authenticate itself, and thereafter carry an unauthorized, full conversation with the access terminal 120. Moreover, transmitting multiple RAND challenges of multiple GSM triplets, as allowed by the EAP-SIM protocol, does not necessarily make the authentication procedure more secure because there is no restriction that each of the RAND challenges be unique. Thus, the impersonator can correctly guess a value of a $K_c$ for a given RAND challenge, calculate the master key based on multiple copies of $K_c$, and then calculate a valid MAC value based on the master key.

Figure 4:
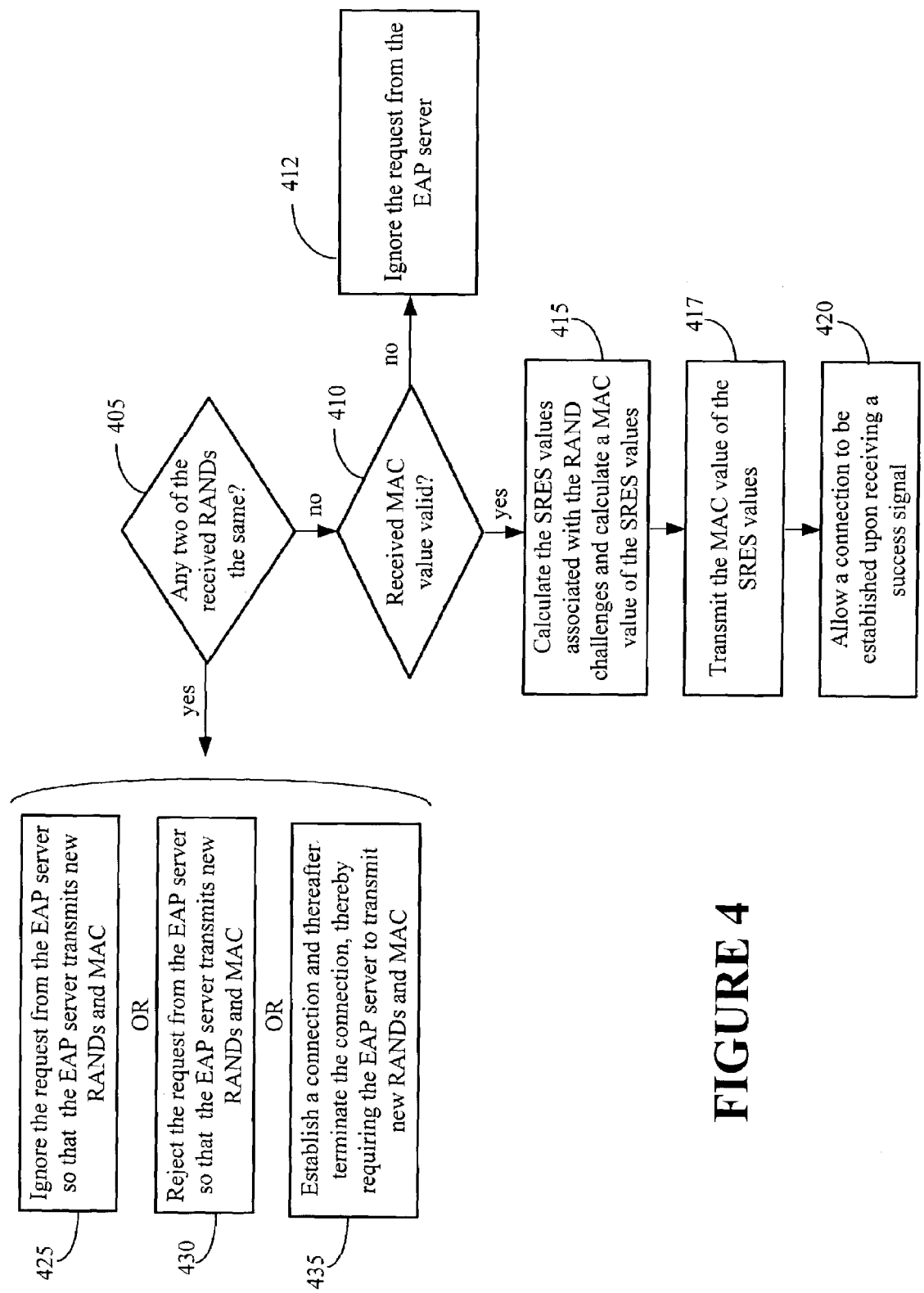
FIG. 4 illustrates a flow diagram of a method that may be employed in the communications system of FIG. 1, in accordance with one embodiment of the present invention.

To reduce the possibility of an unauthorized access, two embodiments are described herein. The first embodiment is illustrated in FIG. 4, which illustrates a flow diagram of the block 227 of FIG. 3, in accordance with one embodiment of the present invention. For illustrative purposes, it is herein assumed that the EAP server 145 transmits multiple RAND challenges, and a MAC value of these RAND challenges for authentication purposes. Referring to FIG. 4, the authentication module 125 (see FIG. 2) determines (at 405) if any two of the received RAND challenges are the same. If no two RAND challenges are the same (or, put another way, if all of the RAND challenges are unique), then the authentication module 125 determines (at 410) if the MAC value received from the EAP server 145 is valid. As noted, the access terminal 120 can determine (at 410) the validity of the received MAC value by independently calculating its own MAC value of the RAND challenges transmitted by the EAP server 145 and then comparing the calculated MAC value to the received MAC value. If the MAC values do not match, then the access terminal 120 ignores (at 412) the challenge request received (see reference 225 of FIG. 3) from the EAP server 145. If a valid MAC value is not received within a prescribed amount of time, no connection is established because of authentication failure.

If the authentication module 125 determines (at 410) that the received MAC value is valid, the authentication module 125 calculates (at 415) the SRES values based on the received RAND challenges and then determines a MAC value of the SRES values. In an alternative embodiment, the authentication module 125 may determine a MAC value based on other information, such as cipher keys, RAND challenges, and the like. The MAC value is then transmitted (at 417) to the EAP server 145 in a response-to-challenge packet (see reference numeral 230 of FIG. 3). The EAP server 145, upon receiving the MAC value from the access terminal 120, verifies the validity of the MAC value, and, if the MAC value is determined to be valid, transmits a success signal (see reference numeral 245 of FIG. 3) to the access terminal 120. Upon receiving the success signal, the authentication module 125 allows (at 420) a session to be established between the access terminal 120 and the mobile services switching center (110, see FIG. 1).

If the authentication module 125 determines (at 405) that at least two of the MAC values received from the EAP server 145 are identical, the authentication module 125 requires the EAP server 145 to transmit unique, valid RAND challenges before a session can be established with the access terminal 120. Requiring each of the RAND challenges to be unique makes the authentication procedure more secure as an unscrupulous party must correctly guess at least two different values (e.g., $K_c$ keys) to establish a connection with the access terminal 120.

If it is determined (at 405) that the MAC values from the EAP server 145 are not unique, then the authentication module 145 may cause the EAP to transmit new RAND challenges in one of several ways. In one embodiment, the authentication module 125 may ignore (at 425) the challenge request (see reference numeral 225 of FIG. 3) from the EAP server 145. Upon an expiration of a preselected amount of time, the EAP server 145 may transmit new RAND challenges, along with their MAC value. In an alternative embodiment, the authentication module 125 may reject (at 430) the challenge request from the EAP server 145, thereby requiring the EAP server 145 to transmit new RAND challenges as well as their MAC value. In yet another alternative embodiment, the authentication module 125 allows (at 435) a connection to be established with the access terminal 120 and thereafter terminates the connection, thus requiring the EAP server 145 to transmit new RANDs and an associated MAC value.

Thus, in accordance with one or more embodiments of the present invention, the authentication procedure is more secure if the access terminal requires each of the received RAND challenges to be different from each other. This approach may be employed within the context of the EAP-SIM protocol without requiring substantial, or any, changes to the proposed EAP-SIM protocol. An alternative embodiment of securing the authenticating procedure of FIG. 3 includes requiring the signed response (SRES) to be part of the master key (MK) calculation. Thus, equation (1) above may be re-written as equation (2) below:

$$MK = SHA[\ldots, \text{cipher keys } (K_{c1}, K_{c2}, K_{c3}), SRES_1, SRES_2, SRES_3, RAND_c, \ldots]. \quad (2)$$

Defining the master key to include the SRES value(s) makes the authentication more secure because it requires an unscrupulous party to not only guess the correct value of $K_c$ but also the SRES value(s). While equation (2) assumes that the EAP server 145 utilizes three GSM triplets (because of the terms $K_{c1}$, $K_{c2}$, $K_{c3}$, $SRES_1$, $SRES_2$, and $SRES_3$), this equation can readily be modified accordingly for use with a single triplet or any other number of triplets. Using equation (2) for calculating the MK makes the authentication procedure more secure even if only one triplet (and thus one RAND challenge) is employed because it requires the adversary to correctly guess not only the value of the $K_c$ but also the SRES value. This alternative embodiment of modifying the MK calculation may require a change to the EAP-SIM protocol insofar as the EAP-SIM protocol defines the algorithm for calculating the master key.

In one embodiment, equation (2) may be employed in lieu of equation (1) for the authentication procedure described in FIGS. 3 and 4. That is, in one embodiment, the authentication procedure may include requiring the master key calculation to include the SRES value(s) (as shown in equation (2)) and it may further include requiring the EAP server 145 to transmit unique RAND challenges in instances multiple GSM triplets are employed.

While FIG. 3 illustrates a mutually authentication procedure, it should be appreciated that one or more of the above-described embodiments of the present invention may also be applicable to a unilateral authentication procedure. In a unilateral authentication procedure, the EAP server 145 may, for example, authenticate the access terminal 120 by transmitting one or more RAND challenges to the access terminal 120, where the access terminal 120 then responds to the received RAND challenges.

For illustrative purposes, one or more embodiments of the present invention are described in the context of a wireless communications system. However, it should be appreciated that in alternative embodiments the present invention may also be implemented in wired networks. Additionally, the present invention may also be applicable to a system supporting voice-only communications or voice and data communications.

Those skilled in the art will appreciate that the various system layers, routines, or modules illustrated in the various embodiments herein may be executable control unit (such as the control unit 122 (see FIG. 2)). The control unit 122 may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit 220 causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method for authentication in a communications system, the method comprising:
   receiving a request for authentication from a server, the request for authentication including a first and a second random challenge;
   comparing the first random challenge and the second random challenge;
   denying the request for authentication in response to determining that the first random challenge is substantially the same as the second random challenge; and
   transmitting an encoded value to the server in response to determining that the first random challenge is different from the second random challenge, wherein the encoded value is generated based on the first and second random challenge and a key that is not shared with the server.

2. The method of claim 1, wherein denying the request for authentication comprises not responding to the request for authentication.

3. The method of claim 1, wherein denying the request for authentication comprises rejecting the request from the server.

4. The method of claim 1, wherein denying the request for authentication comprises establishing a session for at least one of voice and data communications and terminating the session.

5. The method of claim 1, further comprising receiving a message authentication code associated with at least the first random challenge and the second random challenge in response to transmitting an initial random challenge to the server.

6. The method of claim 5, further comprising verifying if the received message authentication code is valid and further comprising establishing a communications session based on determining that the message authentication code is valid.

7. The method of claim 6, wherein verifying the received message authentication code comprises:
   determining a master key based on one or more cipher keys associated with the first random challenge and the second random challenge;
   calculating a message authentication code based on the master key; and
   comparing the calculated message authentication code and the received message authentication code.

8. The method of claim 7, wherein receiving the request for authentication comprises receiving the request for authentication including a third random challenge and wherein denying the request for authentication comprises denying the request if any two of the received random challenges are substantially the same.

9. An apparatus for performing authentication in a communications system, the apparatus comprising:
   a receiver adapted to receive a request for authentication from a server, the request for authentication including a first and a second random challenge; and
   a control unit communicatively coupled to the receiver, the control unit adapted to:
      compare the first random challenge and the second random challenge;
      deny the request for authentication in response to determining that the first random challenge is substantially the same as the second random challenge; and
      transmit an encoded value to the server in response to determining that the first random challenge is different from the second random challenge, wherein the encoded value is generated based on the first and second random challenge and a key that is not shared with the server.

10. The apparatus of claim 9, wherein the control unit is adapted to ignore the request for authentication based on determining that the first random challenge is not equal to the second random challenge.

11. The apparatus of claim 9, wherein the control unit is adapted to reject the request from the server based on determining that the first random challenge is not equal to the second random challenge.

12. The apparatus of claim 9, wherein the control unit is adapted to establish a session for at least one of voice and data communications and to terminate the session based on determining that the first random challenge is not equal to the second random challenge.

13. The apparatus of claim 9, wherein the control unit is adapted to receive a message authentication code associated with the first random challenge and the second random challenge.

14. The apparatus of claim 13, wherein the control unit is adapted to verify the validity of the received message authentication code and to establish a session based on determining that the message authentication code is valid.

15. The apparatus of claim 14, wherein the control unit is adapted to:
determine a master key based on one or more cipher keys associated with the first random challenge and the second random challenge;
calculate a message authentication code based on the master key; and
compare the calculated message authentication code and the received message authentication code.

16. The apparatus of claim 15, wherein the control unit is adapted to receive the request for authentication including a third random challenge and to deny the request for authentication if any two of the received random challenges are substantially the same.

17. The apparatus of claim 15, wherein the control unit is adapted determine the master key based on at least one of a signed response associated with the first random challenge and a signed response associated with the second random challenge.

18. A system, comprising:
a server having access to a plurality of challenges and to a plurality of associated values generated based on a key that is not accessible to the server, the server being adapted to transmit a request for authentication including at least a first and a second challenge from the plurality of challenges; and
an apparatus to:
compare the first random challenge and the second random challenge;
deny the request for authentication in response to determining that the first random challenge is substantially the same as the second random challenge; and
transmit an encoded value to the server in response to determining that the first random challenge is different from the second random challenge, wherein the encoded value is based on at least a portion of the values associated with the first and second random challenges and the secret key.

19. The system of claim 18, wherein the access terminal is adapted to not respond to the request for authentication based on determining that the first random challenge is not equal to the second random challenge.

20. The system of claim 18, wherein the access terminal is adapted to reject the request from the server based on determining that the first random challenge is not equal to the second random challenge.

21. The system of claim 18, wherein the server is adapted to transmit a message authentication code associated with the first random challenge and the second random challenge and wherein the access terminal is adapted to receive the message authentication code.

22. The system of claim 18, wherein the access terminal is adapted to establish a session for at least one of voice and data communications and to terminate the session based on determining that the first random challenge is not equal to the second random challenge.

23. The system of claim 22, wherein the server is adapted to:
generate a message authentication code associated with the first random challenge and the second random challenge, wherein generating the message authentication code comprises determining a master key based on a cipher key and a signed response associated with the first and second random challenges; and
transmit the message authentication code to the access terminal.

24. The system of claim 23, wherein the access terminal is adapted to:
determine a master key based on one or more cipher keys associated with the first random challenge and the second random challenge;
calculate a message authentication code based on the master key; and
compare the calculated message authentication code and the received message authentication code.

25. A system of claim 24, wherein the access terminal is adapted to determine the master key based on at least one of a signed response associated with the first random challenge and a signed response associated with the second random challenge.

26. The system of claim 22, wherein the access terminal is adapted to verify the validity of the received message authentication code and to establish a session based on determining that the message authentication code is valid.

* * * * *